US010265911B1

(12) United States Patent
Capri et al.

(10) Patent No.: US 10,265,911 B1
(45) Date of Patent: Apr. 23, 2019

(54) IMAGE-BASED MONITORING AND FEEDBACK SYSTEM FOR THREE-DIMENSIONAL PRINTING

(71) Applicant: Marvell International Ltd., Hamilton (BM)

(72) Inventors: Sandra Capri, Boise, ID (US); Raymond C. Asbury, Eagle, ID (US)

(73) Assignee: Marvell International Ltd., Hamilton (BM)

( * ) Notice: Subject to any disclaimer, the term of this patent is extended or adjusted under 35 U.S.C. 154(b) by 243 days.

(21) Appl. No.: 15/137,815

(22) Filed: Apr. 25, 2016

Related U.S. Application Data

(60) Provisional application No. 62/160,995, filed on May 13, 2015.

(51) Int. Cl.
| | |
|---|---|
| *G06F 19/00* | (2018.01) |
| *G06K 15/00* | (2006.01) |
| *G06K 15/02* | (2006.01) |
| *B29C 64/386* | (2017.01) |
| *G06T 7/00* | (2017.01) |
| *G05B 19/418* | (2006.01) |
| *B33Y 50/02* | (2015.01) |

(52) U.S. Cl.
CPC ...... *B29C 64/386* (2017.08); *G05B 19/41875* (2013.01); *G06T 7/001* (2013.01); *B33Y 50/02* (2014.12); *G05B 2219/35134* (2013.01); *G05B 2219/49007* (2013.01); *G06T 2207/30144* (2013.01)

(58) Field of Classification Search
CPC .... G05B 19/41875; G05B 2219/49007; G05B 2219/35134; G06T 7/001; G06T 2207/30144; B33Y 50/02
See application file for complete search history.

(56) References Cited

U.S. PATENT DOCUMENTS

| | | | | |
|---|---|---|---|---|
| 5,408,294 A | * | 4/1995 | Lam | G03B 35/14 348/87 |
| 8,332,401 B2 | * | 12/2012 | Hull | G06F 17/30247 707/736 |
| 9,632,037 B2 | * | 4/2017 | Chen | G01N 21/8851 |
| 9,656,492 B2 | * | 5/2017 | Leynadier | B41J 29/38 |
| 9,743,687 B2 | * | 8/2017 | Davila | A21C 11/16 |
| 9,855,698 B2 | * | 1/2018 | Perez | B29C 47/1045 |
| 2006/0170674 A1 | * | 8/2006 | Tsubaki | A61B 6/022 345/419 |
| 2008/0079970 A1 | * | 4/2008 | Matsuhira | G06K 15/02 358/1.9 |

(Continued)

*Primary Examiner* — Ramesh B Patel

(57) ABSTRACT

The present disclosure describes apparatuses and techniques for using an image-based monitoring and feedback system for three-dimensional printing. In some aspects, a camera captures images of objects being printed and an image-processing system compares the images with benchmark images to detect and correct differences between the object and the benchmark. The correction can be in real time or applied to subsequent printing. Other aspects include a calibration system that prints predefined test objects and compares them to benchmarks to ensure that the printer operating parameters are properly set. The comparison can be manually performed by a user or automated as a part of the image-processing system.

20 Claims, 7 Drawing Sheets

(56) References Cited

U.S. PATENT DOCUMENTS

| | | | | |
|---|---|---|---|---|
| 2012/0182374 A1* | 7/2012 | Matsuda | ............... | G06F 3/1208 347/225 |
| 2014/0043630 A1* | 2/2014 | Buser | ................ | B29C 67/0055 358/1.13 |
| 2014/0065194 A1* | 3/2014 | Yoo | .................... | B29C 67/0081 424/400 |
| 2014/0117585 A1* | 5/2014 | Douglas | ................. | B29C 47/92 264/401 |
| 2015/0045928 A1* | 2/2015 | Perez | .................... | B29C 64/112 700/110 |
| 2015/0206020 A1* | 7/2015 | Jurkewitz | ............... | B41F 33/00 382/112 |
| 2015/0273768 A1* | 10/2015 | Wyatt | ................. | B29C 67/0088 700/119 |
| 2015/0301517 A1* | 10/2015 | Chen | ................. | G05B 19/4099 700/118 |
| 2015/0306824 A1* | 10/2015 | Flores Mangas | ...... | G05B 15/02 700/98 |
| 2015/0331402 A1* | 11/2015 | Lin | .................... | G06F 17/5009 700/119 |
| 2016/0283833 A1* | 9/2016 | Peek | .................... | G06K 15/408 |
| 2017/0057170 A1* | 3/2017 | Gupta | ................ | B29C 67/0088 |
| 2017/0085733 A1* | 3/2017 | Ilic | ......................... | G06T 19/20 |

* cited by examiner

IMAGE-BASED MONITORING AND FEEDBACK SYSTEM FOR THREE-DIMENSIONAL PRINTING

CROSS REFERENCE TO RELATED APPLICATIONS

This present disclosure claims priority to U.S. Provisional Patent Application Ser. No. 62/160,995 filed May 13, 2015, the disclosure of which is incorporated by reference herein in its entirety.

BACKGROUND

This background description provides context for the disclosure. Unless otherwise indicated, the approaches described in this section are not prior art to the claims in this disclosure and are not admitted to be prior art by inclusion in this section.

Despite its increasing popularity, three-dimensional (3D) printing can be intimidating and frustrating. A 3D printing task may require multiple attempts and many adjustments to different operating parameters of the 3D printer before the desired output is successfully printed. For new users, the learning curve can make the process frustrating until the user is familiar with the printer and how to adjust it. Further, even for a reasonably skilled user, new or complicated designs may not print successfully without significant repetition and intervention to properly set the operating parameters to resolve printing issues.

Additionally, 3D printing systems require the user to verify that the printed item was printed correctly, including parts that may not be clearly visible once the entire object is complete. Consequently, users may have to observe the entire printing process to check that structures that will later be hidden have properly printed. Because there is typically no way to dynamically adjust the printing while it is in progress, if an error is observed, the user will have to stop the printing and start over.

SUMMARY

This summary is provided to introduce subject matter that is further described below in the Detailed Description and Drawings. Accordingly, this Summary should not be considered to describe essential features nor used to limit the scope of the claimed subject matter.

A system for improving print quality of a three-dimensional (3D) printer is described. This system includes a camera configured to capture an image of an object being printed by the 3D printer while the object is being printed and an image-processing system. The image-processing system includes a processor and a computer-readable media device embodying computer-executable instructions that, when executed by the processor, implement an image-comparison module. The image-comparison module is configured to perform operations including receiving, from the camera while the 3D printer is printing, the image of the object being printed by the 3D printer, comparing the image to a benchmark image, identifying a difference between an element of the object and an analogous element of the benchmark image, and determining an operating parameter of the 3D printer related to the difference. The image-comparison module may then send the operating parameter or determine and send a control signal to the 3D printer. The operating parameter or the control signal are effective to adjust the operating parameter of the 3D printer.

A method for using a 3D printer with a camera and an image-processing system is also described. The method includes receiving, from a camera communicatively connected to the 3D printer and while the 3D printer is printing, an image of an object being printed by the 3D printer. The method then compares the image to a benchmark image, identifies a difference between an element of the object and an analogous element of the benchmark image, and determining an operating parameter of the 3D printer related to the difference.

A method for calibrating a 3D printer is also described. The method includes detecting a change in a status of the 3D printer, responsive to detecting the change, printing a predefined test object, and evaluating the predefined test object by comparing the predefined test object to a benchmark. The method then identifies a difference between a print characteristic of the predefined test object and an analogous print characteristic of the benchmark, determines that the difference exceeds a threshold, identifies an operating parameter of the 3D printer that is associated with the identified difference, and adjusts the operating parameter. This adjustment to the operating parameter is effective to reduce, in subsequent printing operations, the difference between the print characteristic of the predefined test object and the analogous print characteristic of the benchmark.

The details of one or more implementations are set forth in the accompanying drawings and the description below. Other features and advantages will be apparent from the description and drawings, and from the claims.

BRIEF DESCRIPTION OF THE DRAWINGS

The details of one or more implementations of image-based monitoring and feedback system for three-dimensional printing are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Overview

Current three-dimensional (3D) printing systems can be inefficient and difficult to use. These systems often require repeated user interventions to adjust operating parameters to correct defects, which is both time consuming and often ineffective, resulting in failed print jobs. Further, many defects are not discovered until after a long printing job is finished, which requires the user to discard the job and start over from scratch. Even after starting over, another failed job may result if the user does not adequately adjust the operating parameters responsible for the prior print failure.

To correct these and other conventional 3D printing problems, this disclosure describes techniques and apparatuses for an image-based vision system that provides dynamic monitoring and feedback for 3D printing. This system and apparatus detects defects as they occur and either attempt to correct the defect while the print process continues, or stop the printing and alert the user.

By way of example, consider a user who has a 3D printing project that takes five hours to complete. Assume that the user has used 3D printers, but that the project is a design that the user has not printed before. The user, being relatively experienced, sets up the 3D printer in the morning and once it is running, leaves the printing area to return to work. When the user returns several hours later, the printing job is complete, but the user discovers that the printed object has lifted corners on the bottom layer and delamination problems on some long edges. In this example, the user has wasted more than half a day's work, along with the machine time and materials consumed in the unsuccessful printing.

In contrast, consider the same example with the user aided by the techniques and apparatuses described in this disclosure. Not long after the user leaves, the monitoring and feedback system detects that some corners of the bottom layer are beginning to lift. An image-processing system adjusts one or more operating parameters of the 3D printer (e.g., the baseplate temperature), which corrects the error. Later, the vision system detects that some layers are not bonding to each other. The image-processing system again makes some adjustments to the system (e.g., to the vertical distance between the print nozzle and the previous layer), but the adjustment does not resolve the issue. The image-processing system stops the printing job and displays an error message on the 3D printer, and/or sends a message to the user's mobile device. The user returns and is able to solve the problem and re-start the printing. In this scenario, the print job is completed without wasting time or materials.

The following discussion describes example systems, various devices that may be included in the example system, and techniques for using the system and devices. In the discussion below, any reference made to an operating environment is by way of example only.

Example System

Figure 1:
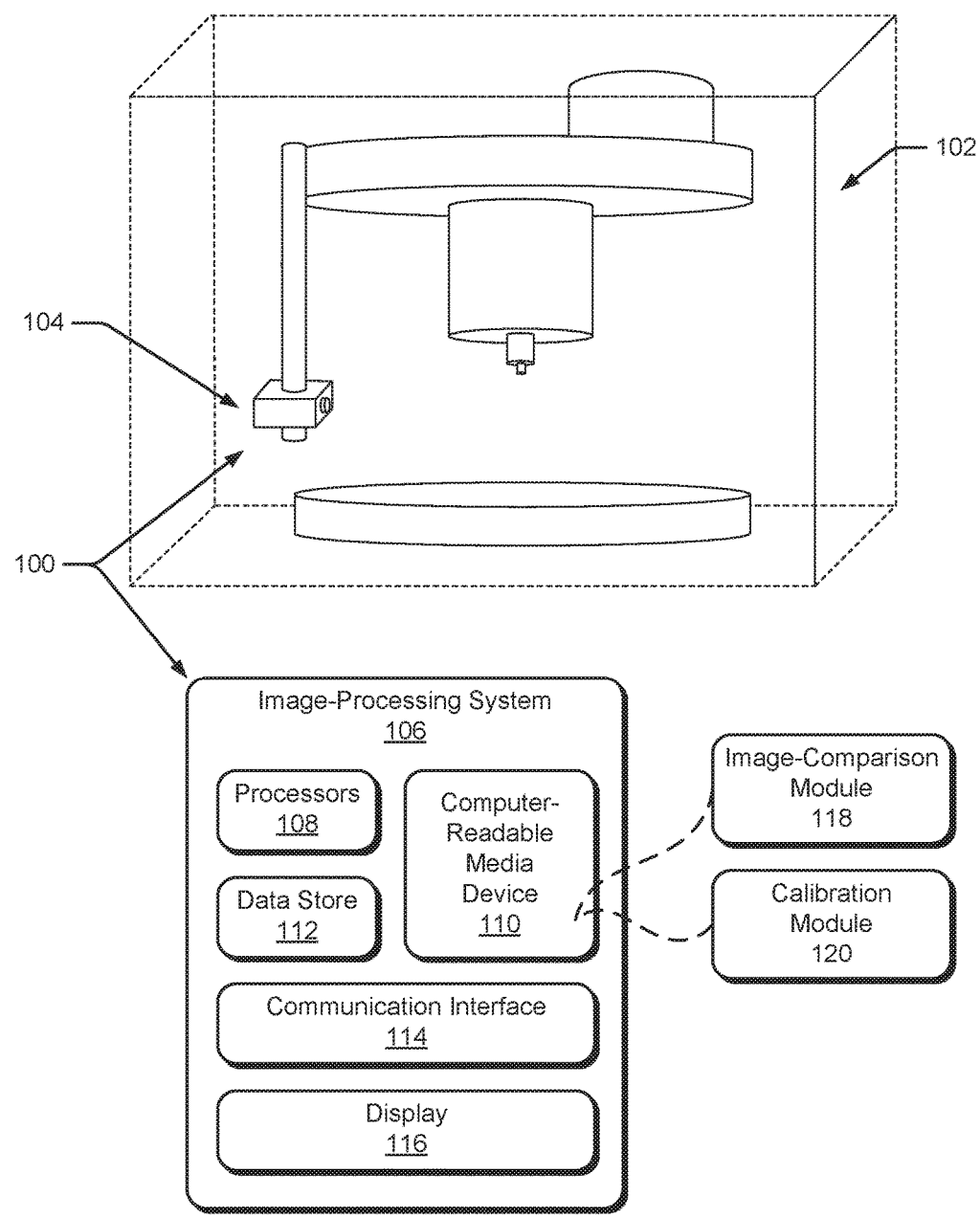
FIG. 1 illustrates an example three-dimensional (3D) printing system that includes a monitoring and feedback system that can be implemented in accordance with one or more aspects.

FIG. 1 illustrates an example of an image-based monitoring and feedback system 100 (image system 100) and a three-dimensional (3D) printer 102. The image system 100 includes a camera 104 and an image-processing system 106. The system 100 may also include one or more sensors (not shown on FIG. 1) such as a force transducer, a temperature sensor, a SONAR array, and so forth.

The 3D printer 102 can be any type of 3D printer and may operate with various printing materials (e.g., plastics, powdered metals, ceramics, waxes, and so forth). The printer 102 may include an enclosure (represented in FIG. 1 by dashed lines), but the enclosure is not required. Further, other internal support structures of the 3D printer 102 are omitted for clarity.

The camera 104 is configured to capture images of the objects being printed by the 3D printer 102 while they objects are being printed. The camera may capture images in one or more light spectra (e.g., the visible spectrum, the infrared spectrum, the UV spectrum, and so forth). While the camera 104 is shown as a single camera that can rotate about the printing environment, other configurations are contemplated. For example, there may be multiple cameras, which may be fixed and/or rotating, and so forth.

The image-processing system 106 includes one or more processors 108, a computer-readable media device 110, a data store 112, and a communication interface 114 to allow communication and control of the image-processing system 106, the 3D printer 102, or the camera 104. The communication interface 114 can be presented on a display 116 or provided in other manners. Additionally, the image-processing system 106 can implement an image-comparison module 118 and a calibration module 120, shown included within the computer-readable media device 110. While shown within computer-readable media device 100, these modules may be computer-readable instructions, hardware, firmware, or some combination thereof.

Figure 2:
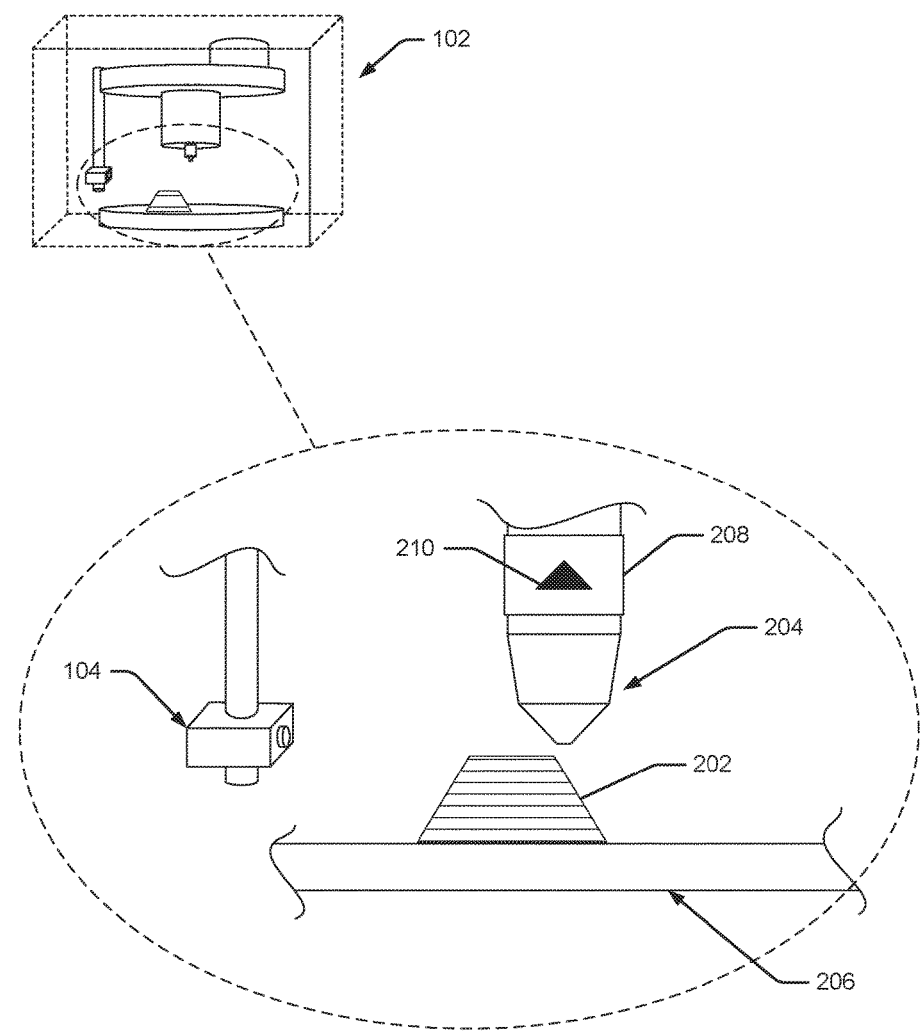
FIG. 2 illustrates additional features and details of the monitoring and feedback system shown in FIG. 1.

FIG. 2 illustrates additional features and details of the image system 100 and the 3D printer 102. Detail view 200 illustrates parts of the 3D printer 102, the camera 104, and also includes an object being printed 202, printing nozzle 204 and baseplate 206. The 3D printer 102 may also include a test target and/or a display (not shown on FIG. 2). As mentioned above, the image system 100 can be implemented with various 3D printers and printing technologies (fused deposition modeling, electron-beam melting, selective laser sintering, stereo lithography, and so forth). Other printing technologies may require different components in addition to, or in place of, the components shown on FIG. 2.

As noted above, the camera 104 is configured to capture images of an object being printed by the 3D printer 102 while the object is being printed. The image-processing system 106 can receive the images from the camera 104 while the 3D printer 102 is printing the object 202. The image-processing system 106 then compares the image of the object 202 to a benchmark image. The benchmark image may be stored in the data store 112 of the image process system 106, or in another storage location with which the image-processing system 106 can communicate (e.g., via the communication interface 114). While the stored benchmark image can be an actual captured image of a prior-printed object known to be accurately printed, and thus useful as a benchmark, the benchmark image may instead be generated from the information contained in the model the 3D printer 102 uses to print the object 202. Thus, a computer-aided design model or other model used by the 3D printer 102, or a model from which data used by the 3D printer 102 is derived, can instead be used to create a benchmark image. Consider a line drawing model, for example, which can be converted into, or be used as, a benchmark image. In some other cases, a benchmark image is not used, instead the captured images of the object being printed are analyzed using an adaptive algorithm (e.g., edge detection, successive approximation techniques, and so forth) that determines the adherence of the printed object 202 to various criteria, such as edge straightness, angular values, curve-matching, and so forth.

Once the image of the object 202 and the benchmark image are compared, the image-processing system 106 can identify differences between elements of the object 202 as captured in the image and analogous elements of the benchmark image. If differences are identified, the image-processing system 106 determines operating parameters of the 3D printer 102 that are related to the difference. The image-processing system 106 can send these operating parameters to the 3D printer 102, or first determine, based on the operating parameters, a control signal. In either case, the image-processing system enables the 3D printer 102 to adjust the related operating parameter to correct the error, correct the problem so that the error is not continued going forward, or correct the problem for future print jobs.

The control signal adjusts operating parameters that do not require manual user adjustment. A non-limiting list of example parameters includes: the distance between the printing nozzle 204 and the base plate 206, the distance between the printing nozzle 204 and the surface of the previously printed layer of the object 202, the velocity of the printing nozzle 204, the X-Y location of the printing nozzle 204 above the base plate 206, the vertical position of the base plate 206 (e.g., the levelness of the baseplate 206 with reference to a plane perpendicular to the printing nozzle 204), the temperature of the printing nozzle 204, the temperature of the material being extruded from the printing nozzle 204, the temperature of the base plate 206, and the rate of extrusion from the printing nozzle 204.

The adjustment can be sufficient to decrease the difference between the element of the object 202 and the analogous element of the benchmark image while the object 202 is being printing. In this case, the image-processing system 106 dynamically corrects the difference so that the remainder of the current object being printed is properly printed.

In some other cases, the error is too large to continue printing, or the adjustment needed is too large to permit the print job to continue. In such a case, the operating parameters or control signal to adjust it, are used to successfully print subsequent instances of the object 202.

Consider, for example, a case where, at some point during printing operations, the image-processing system 106 determines that the printing nozzle 204 is not close enough to the previously printed layer to allow the current layer to bond. The image-processing system 106 can send a control signal to the 3D printer 102 that adjusts the height of the printing nozzle 204 closer to the previously printed layer. The image-processing system 106 will continue to receive images from the camera 104 and, if the height adjustment corrects the problem, the printing job will continue. If the image-processing system 106 detects that the adjustment did not correct the problem, it may try another solution, or pause the printing job and alert the user. In still other cases, the decrease in difference may be achieved by re-printing the element in which the difference was detected. For example, if the image-processing system 106 determines that a print layer is thinner than the corresponding benchmark layer, the adjustment may include re-printing the thin layer.

The image-processing system 106 may also be configured to learn from its attempts to correct printing problems identified by the difference between elements in the image of the object 202 and the benchmark image. For example, in response to adjusting an operating parameter to decrease the difference between an element of the object 202 and the analogous element of the benchmark image, the image-processing system 106 can identify the value of the adjusted parameter, associate the value with the difference and store the value of the adjusted parameter associated with the difference. This allows the image-processing system 106 to learn that a particular adjustment (the stored value) addresses a particular printing problem (the difference). In a subsequent printing operation, if the image-processing system 106 determines there is a similar difference between the same kind of elements of the subsequent object and the analogous element of the benchmark image, the associated value can be sent, via the control signal, to adjust the parameter.

In other embodiments, the image-processing system 106 may be configured to allow the value of the adjusted parameter to be manually associated with the value of the difference (e.g., by a user). The value of the adjusted parameter associated with the difference can then be stored and used as described above.

The image-processing system 106 may also be configured to pause printing operations and alert the user of a problem. For example, the image-processing system 106 may receive an image of the object 202, compare the image to the benchmark image, and determine that the difference between an element of the object 202 and the analogous element of the benchmark image exceeds a threshold. In response, the image-processing system 106 can send a control signal to the 3D printer 102 that pauses the printing of the object 202. After the printing is paused the image-processing system 106 can send another control signal that causes the 3D printer 102 to display an error message. In some embodiments, the communication interface of image-processing system 106 may be configured to send an error message to a mobile device, or to another device, to alert a user that is not near the 3D printer 102.

Determining that the difference exceeds a threshold may be part of each image capture and comparison, so that the first time the difference is determined to exceed the threshold, printing is paused. In other embodiments, determining that the difference exceeds the threshold is only part of the operations if the image-processing system 106 has already attempted to decrease the difference between the element and the analogous element of the benchmark image (e.g., the threshold may be applied to every image comparison, or only to determine if a previous adjustment was successful).

As noted above, the image system 100 may also include a sensor (not shown on FIG. 2) such as a force transducer, a temperature sensor, a SONAR array, and so forth. The sensors can be used to measure properties and qualities of the object 202 (e.g., mass, density, internal structures, and so forth). In embodiments that include one or more sensors, the image-processing system 106 can receive an input value related to a print-quality characteristic of the object 202 from the sensor while the 3D printer is printing and compare the input value to a benchmark value. As with the image comparisons described above, the image-processing system 106 can then measure a difference between the input value and the benchmark value and identify an operating parameter of the 3D printer 102 that is related to the difference. Once a related operating parameter is identified, the image-processing system 106 can send a control signal to the 3D printer 102 to adjust the other operating parameter of the 3D printer, or send the operating parameter for the 3D printer 102 to determine the control signal. Again, as with the control signals sent in response to image comparisons, the adjustment caused by the control signal may be sufficient to decrease the difference between the input value and the benchmark value while the object 202 is being printed, or the adjustment may not decrease the difference while printing the current object 202, but only for subsequent instances of the object 202 or similar objects.

The camera 104 and the sensors may be used in combination to determine properties of the printing material being used to print object 202. For example, a sensor can measure the temperature of the printing nozzle 204 and the camera 104 can capture images of the material as it is extruded and measure the deflection of the material (e.g., droop) at different temperatures. The combination of temperature and deflection may allow the image-processing system 106 to identify characteristics of the printing material such as an approximation of tensile strength, actual or approximate density, and so forth that enable the image-processing system 106 to more accurately adjust operating parameters in response to detecting differences as described above.

The image system 100 may also include a test target that can be used to calibrate the camera 104. The test target has one or more features with visual characteristics that are known to the image-processing system 106. For example, the test target may include features that have a known shape, color, size, distance from the camera 104, and so forth. In embodiments that include the test target, the image-processing system 106 can receive an image of the test target from the camera 104 and analyze the image to determine the visual characteristics of the test target as represented in the image. The visual characteristics of the test target as represented in the image can then be compared to the known visual characteristics of the test target. The image-processing system 106 can adjust operating parameters of the camera 104 to match the visual characteristics as represented in the image to the known visual characteristics. The test target can be an image or object of a known size, for example, such as a jacket 208 with an test image 210 that wraps around the printing nozzle 204 so that the camera 104 can see it from any position.

Example Methods

The following discussion describes techniques for image-based monitoring and feedback in three-dimensional printing. These techniques can be implemented using the previously described environments and entities, such the three-dimensional (3D) printer 102, the camera 104, and the image-processing system 106. These techniques include methods illustrated in FIG. 3 through FIG. 7, which show sets of operations performed by one or more entities. These methods are not necessarily limited to the orders shown for performing the operations and may be looped, repeated, or re-ordered to implement various aspects described herein. Further, these methods may be used in conjunction with other methods described herein, in whole or in part, whether performed by the same entity, separate entities, or any combination thereof. In portions of the following discussion, reference will be made to the example 3D printing system 100 as described in FIGS. 1 and 2, along with entities of FIGS. 1 and 2, by way of example. Such reference is not to be taken as limited to operating environments described in FIG. 1 or 2, but rather as illustrative of one of a variety of examples.

Figure 3:
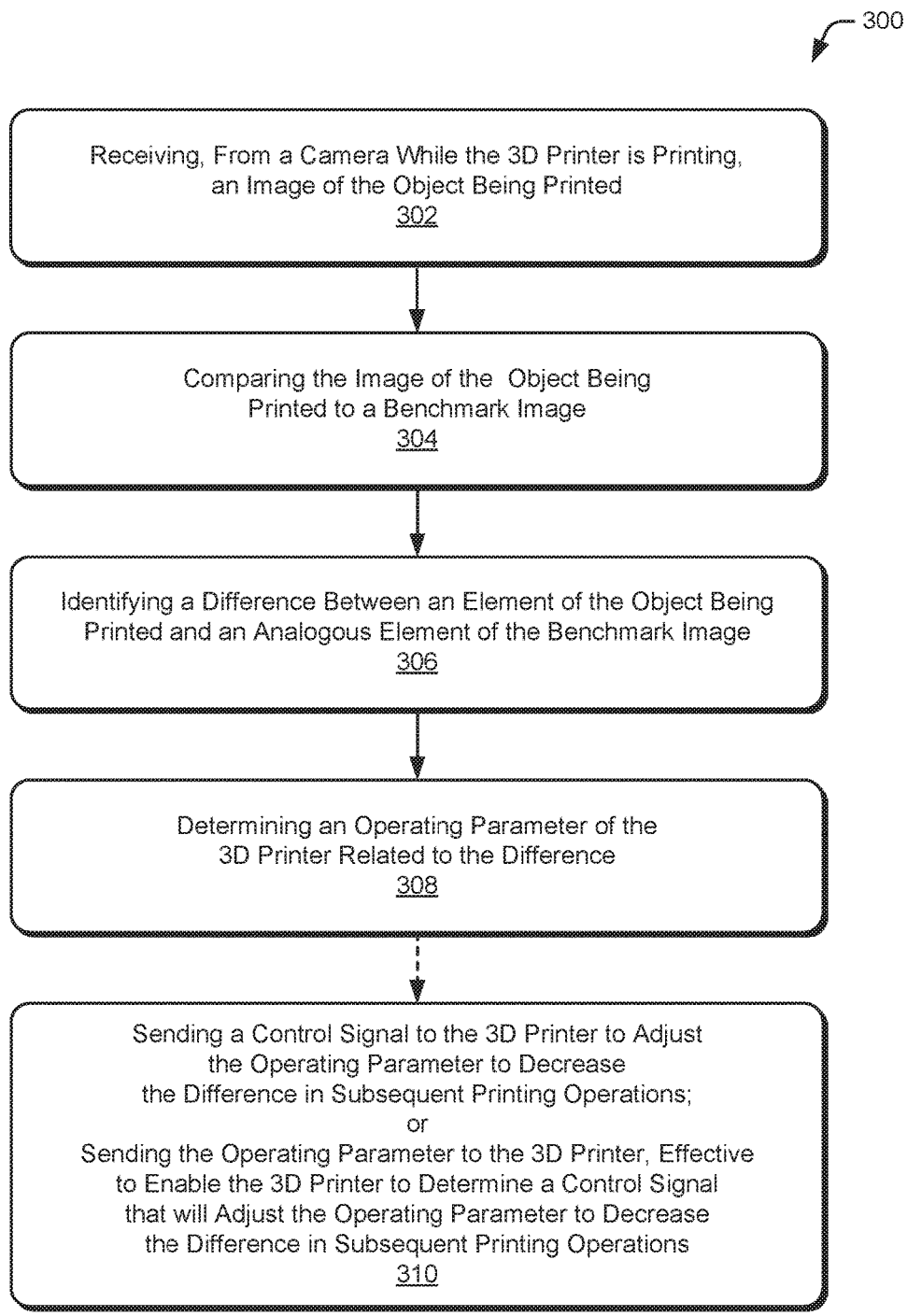
FIG. 3 illustrates an example method for 3D printing with the monitoring and feedback system.

FIG. 3 depicts a method 300 for 3D printing with an image-based monitoring and feedback system. At 302, an image of an object being printed by the 3D printer is received from a camera. The image is an image of the object being printed, and may be received at the same time as the object is printed (e.g., in "real-time").

At 304, the received image is compared to a benchmark image. As described above, the benchmark image may be stored by the image-processing system (e.g., in a data store), stored in another storage location with which the image-processing system can communicate, or calculated from the model used to print the object. Here the image-comparison module 118 compares the image taken with the benchmark image. Assume that it is well understood that, after applying four layers of filaments to create a four-filament-thick layer, that the layer should be of a particular width (four filaments), have a certain external dimension or look (four filaments laid one on top of the other, aligned exactly without any layers drooping over others, with a "log-cabin" look from a side), and so forth. A benchmark image can show exactly this—the correct, expected thickness, external dimensions and look. The actual image of the object during printing may look nearly identical, but it may not. If the image indicates that the layer is not four filaments thick, but is instead 3.8, it may indicate that the filaments are being applied with too much speed, and thus are too thin, or are too hot, and thus are flattening during printing, and so forth. The external look of the layer may indicate which, such as with a reflectivity of the surface being higher with the filaments are thin than when the filaments are flattened, or with the external look being "log-cabin" like, indicating too much speed but consistent stacking, or a sloppy, melted look, indicating that the filament temperature is too high.

Other manners of image capture and comparison are also contemplated herein, such as lack of adhesion between layers being shown by filaments sliding off of the top of the prior-placed filament (e.g., the filaments being offset one from another rather than exactly stacked).

Note that in addition to a benchmark image, images of errors can also be recorded and compared with a captured image of an object. Some errors are common, and alone or in conjunction with comparison with the benchmark image, can indicate an error and aid in determining the type of error. With the type of error known, the operating parameter to adjust can also be known or better known.

At 306, the image-processing system identifies a difference between an element of the object as represented in the image and an analogous element of the benchmark image. Continuing the ongoing example, assume that the image-comparison module 118 determines that a layer that should be four filaments thick is instead 3.8, with a difference for that element being a thickness that is 0.2 less filament thicknesses than the benchmark image.

At 308, the image-processing system determines an operating parameter of the 3D printer that is related to the difference identified at 306. For the 0.2 less thickness noted, assume that the image-comparison module 118 determines that the 3D printer 102 is applying the filament too quickly, and therefore the operating parameter is print-head speed being too high. Here the image-comparison module 118 can determine the control signal to correct the error, such as one to slow down the print head, or simply pass the operating parameter (print head speed too high) to the 3D printer 102.

At 310, the image-processing system may send a control signal to the 3D printer to cause the 3D printer to adjust the operating parameter to decrease the difference between the element of the object and the analogous element of the benchmark image in subsequent printing operations. As noted, the image-processing system 100 may also or instead send the operating parameter determined at 308 to the 3D printer. The operating parameter enables the 3D printer to determine a control signal to adjust the operating parameter to decrease the difference between the element of the object and the analogous element of the benchmark image in subsequent printing operations. Concluding the example, the control signal decreases the speed of the print head. This may correct the error for the next layers—and thus at eight layers the thickness is either 7.8 or 8.0 (whether to correct the error going forward or slow down some number of printing layers to make the layer thicker, and then going forward as usual). Note that this may be an iterative process, where the next four layers are 3.9 or 4.1 filaments thick, with another image captured, and the image-comparison module 118 adjusting accordingly.

In either case described with respect to operation 310, the decrease in the difference between the element of the object and the analogous element of the benchmark image may take different forms. In one aspect, the control signal may instruct the 3D printer to re-print the element which embodied the difference. For example, if the identified difference comprises a filament that is thinner than the benchmark, the control signal may cause the 3D printer to re-print that filament. In other aspects, the control signal may cause the printer to use the adjusted operating parameter for the remainder of the operations to print the object, without re-printing the element that embodied the difference. In still cases, the control signal may cause the printer to adjust the operating parameter for future instances of printing the object, without changing the parameter for the current object. In other words, the decrease in the difference may apply to the actual element that exhibits the difference, the remainder of the printing of the object in which the difference is detected, or only for future printing operations.

Figure 4:
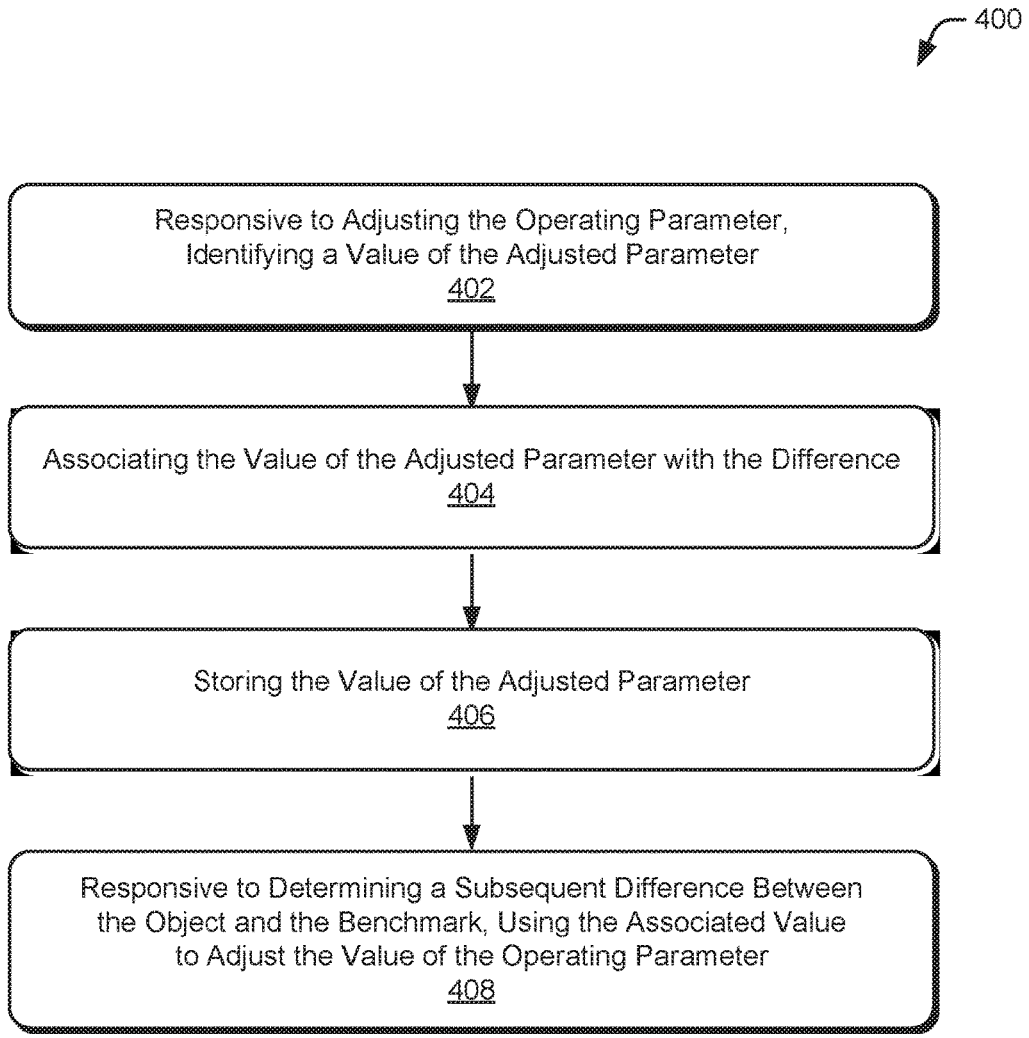
FIG. 4 illustrates additional details of an example method for 3D printing with an image-based monitoring and feedback system in accordance with one or more aspects.

FIG. 4 illustrates method 400, which may be performed alone or in conjunction with method 300. At 402, in response to adjusting the operating parameter at 310, a value of the adjusted parameter is identified.

At 404, a value of the adjusted parameter is associated with the difference between the between the element of the object and the analogous element of the benchmark. Over time, or in some cases at a single performance of method 300, an control signal or amount to adjust a parameter is correlated with the difference—thus, for a filament thinness of 5% too thin (e.g., 3.8 instead of 4 for four filaments), a known reduction in speed of the print head corrects this 5% error.

At 406, the value of the adjusted parameter is stored (e.g., in data store 112 of the image-processing system shown in FIGS. 1 and 2.

At 408, in response to identifying a subsequent difference between the element of the object and the analogous element of the benchmark image, the associated value is used to adjust the parameter. Thus, when an adjustment is found to be successful, it is stored for use again with a similar problem.

Method 400 can be used in conjunction with method 300 to determine which aspect of 310 to implement. For example, if the image-processing system identifies a difference that it has not previously identified, it may determine an operating parameter to adjust along with an adjustment value that will decrease the difference, and sends the adjustment value via the control signal (in accordance with the first option illustrated at 310).

In another situation, however, the image-processing system identifies a difference for which it has stored a previously associated value of an adjusted parameter, according to method 400. The image-processing system then needs only to send the operating parameter and the 3D printer can use the stored value to determine a control signal. For example, the 3D printer can determine the control signal by identifying a previously stored value of the parameter sent by the image-processing system (the previously stored value having been adjusted to decrease the difference in a previous printing operation), and then use the previously stored value to adjust the operating parameter.

Figure 5:
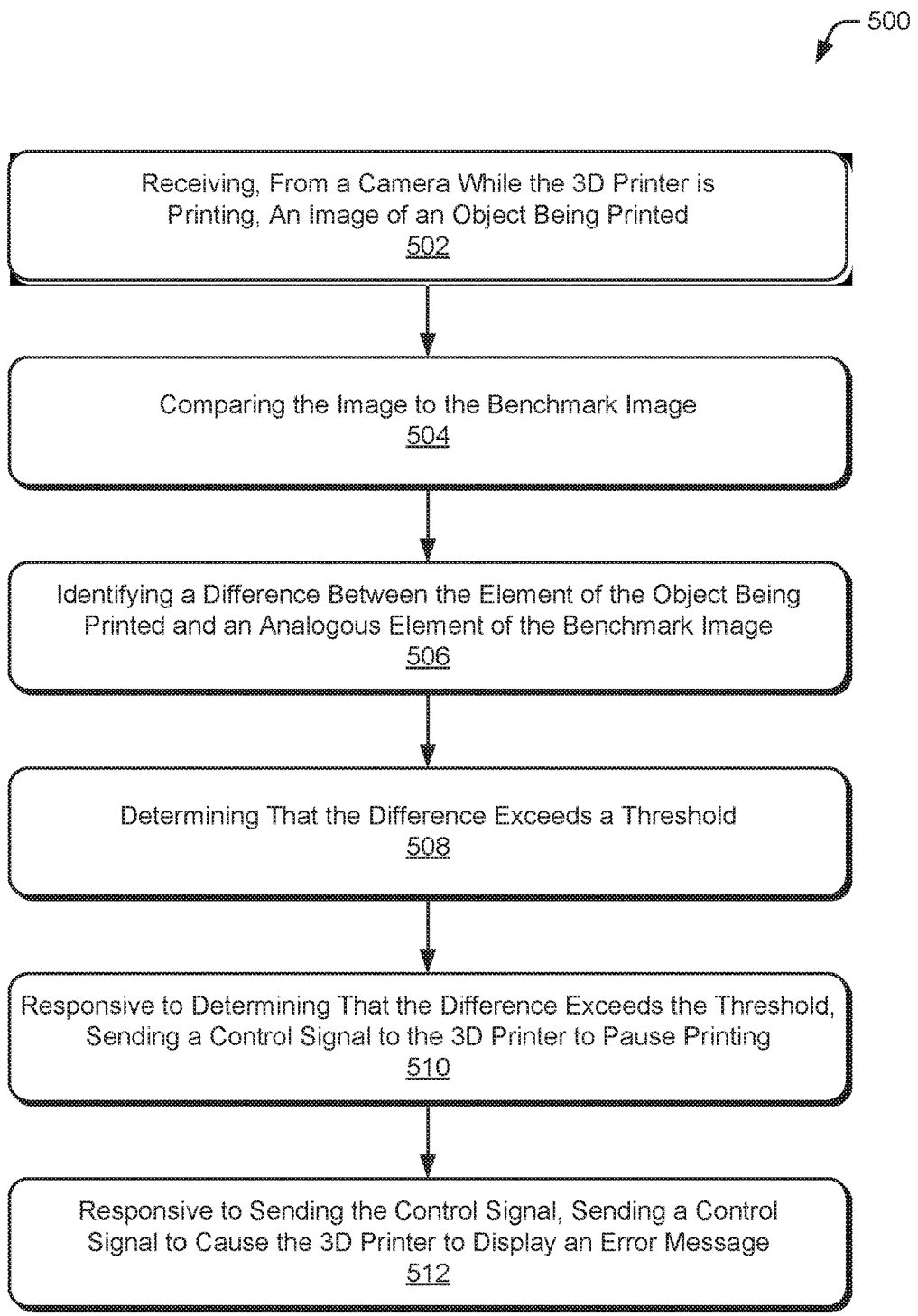
FIG. 5 illustrates additional details of an example method for 3D printing with an image-based monitoring and feedback system in accordance with one or more aspects.

FIG. 5 illustrates method 500, which may operate with methods 300 or 400, alone or in part. At 502, an image of the object being printed is received from the camera. As described with reference to FIG. 3, the image may be received at the same time as the object is printed (e.g., in "real-time").

At 504, the received image is compared to a benchmark image, similar to as described above.

At 506, the image-processing system identifies a difference between the element of the object as represented in the image and an analogous element of the benchmark image.

At 508, the image-processing system determines that the difference exceeds a threshold. Also at 508, additional determinations may be performed based on whether the difference exceeds the threshold. For example, it may be determined that the difference is too difficult to correct, such as when a failure will not be correctable and will ruin the resulting project. Stopping can therefore save time and materials by forgoing printing an object that will not be used.

At 510, in response to determining that the difference exceeds the threshold, a first control signal is sent to the 3D printer, which causes the 3D printer to pause printing the object.

At 512, in response to sending the first control signal, a second control signal is sent to the 3D printer, which causes the 3D printer to display an error message (e.g., on display 116). As described with respect to FIG. 2, some embodiments of the image-processing system may also be configured to send an error message to another device, including to a mobile device, to alert a user that is not near the 3D printer (e.g., via communication interface 114).

Methods 300, 400, and 500 are performed using a camera, though they can also be used analogously for systems that include sensing devices other than the camera 104 (e.g., a force transducer, a temperature sensor, or a SONAR detector, and so forth). For example, if a temperature sensor identified a temperature difference between an element of an object being printed and a benchmark temperature profile for the object (using an infrared sensor or captured image, for example), the methods illustrated could be used to identify operating parameters and or send controls signal to decrease the difference, as explained above.

Figure 6:
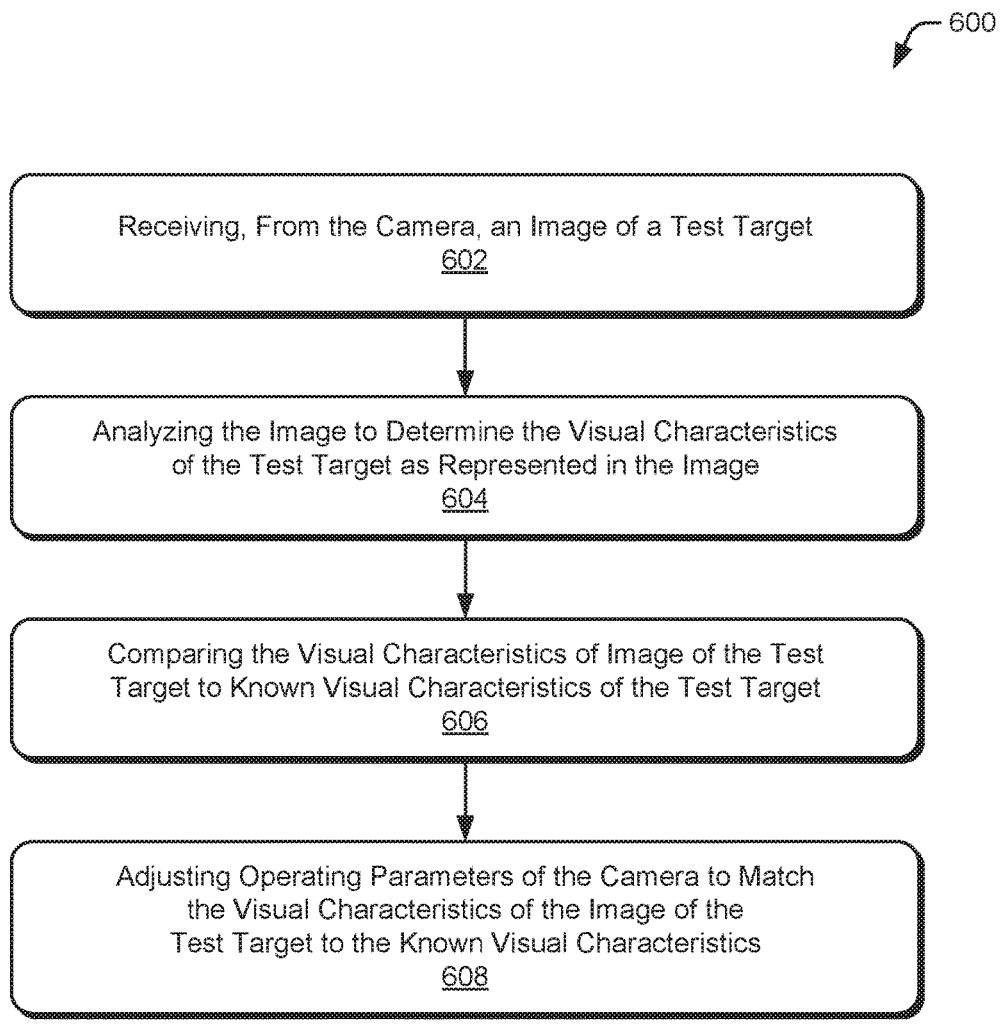
FIG. 6 illustrates additional details of an example method for 3D printing with an image-based monitoring and feedback system in accordance with one or more aspects.

FIG. 6 depicts a method 600 for 3D printing with an image-based monitoring and feedback system, including use of a test target to calibrate the system.

At 602, an image of a test target of the 3D printer is received from the camera. The image may include the entire test target or portions of the test target. Consider, for example, the test image 210 of a triangle. This test image 210 can be used to determine how to calibrate for size and angle—the base of the triangle indicating zero degrees horizontal, and the triangle being of a known size.

At 604, the image is analyzed to determine the visual characteristics of the test target as represented in the image. The visual characteristics may include characteristics such a shape, a color, a size, or the distance of the test target from the camera. Thus, an image may have color or reflectivity characteristics, thereby enabling calibration of color or brightness in addition to size and orientation.

At 606 the visual characteristics of the test target as represented in the image are compared to known visual characteristics of the test target. If the image captured is not zero degrees at the base of the triangle, for example, the camera is known to be canted in some manner, which can in most cases be addressed without having to physically alter the camera orientation.

At 608, one or more of the operating parameters of the camera are adjusted to match the visual characteristics of the test target, as represented in the image, to the known visual characteristics of the test target. Method 600 enables the camera to be calibrated using the test target. For example, if a color of an element of the test target as represented in the image does not match the known color associated with the element, the image-processing system may adjust operating parameters of the camera (e.g., filters, apertures, and so forth) to cause the color of the element in the image to match the known color.

Figure 7:
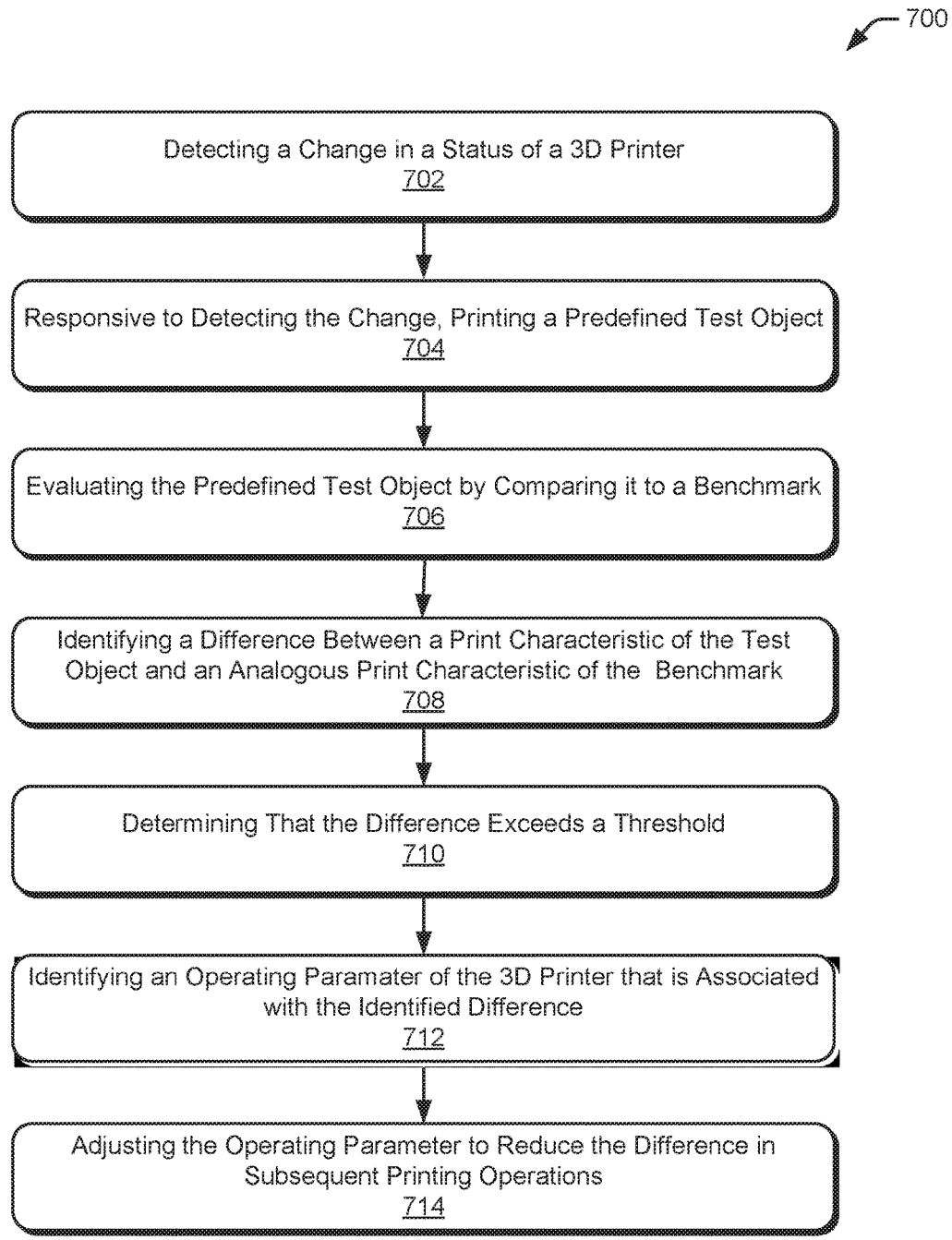
FIG. 7 illustrates an example method for calibrating a 3D printer in accordance with one or more aspects.

FIG. 7 depicts a method 700 for calibrating a 3D printer through printing of a predefined test object. At 702, a change in the status of the 3D printer is detected. The change in status can include nearly any change that can be sensed. For example, the calibration module 120 of FIG. 1 can determine or receive a change in status, such as a power cycle performed on the 3D printer, a different printing nozzle installed in the 3D printer, a different printing material installed in the 3D printer, a predetermined period of time having elapsed since the 3D printer was last calibrated, a predetermined number of printing operations having been performed since the 3D printer was last calibrated, a calibration command having been received via a user input, and so forth.

At 704, in response to detecting the change in status, the 3D printer prints a predefined test object. As noted, this can be of various types or sizes, each of which is predefined to permit calibration of a known test against known associated benchmark images. Here the calibration module 120 determines a test object to be printed, such as one associated with the change in status detected, or a general object. Assume that a new printing nozzle is installed—this may indicate to the calibration module 120 that filament heating and print head speed may need to be calibrated, thereby indicating an appropriate test object.

At 706, the predefined test object is evaluated by comparing the predefined test object to a benchmark. The comparison may include using the camera to capture an image of the predefined test object while the predefined test object is being printed. Then the image of the predefined test object being printed is compared to an image of the benchmark. The image capture and comparison may be manually performed (e.g., by a user), or performed automatically (i.e., without user intervention). Here the automatic process is performed by the calibration module 120 of the image-processing system 106.

At 708, a difference between a print characteristic of the predefined test object and an analogous print characteristic of the benchmark is identified. A print characteristic can include nearly any number of attributes of the test object. For example, a non-limiting list of print characteristics includes a thickness of a printed layer, a uniformity of a printed layer, a thickness of a filament at a point of extrusion from the 3D printer, a uniformity of a filament at a point of extrusion from the 3D printer, a measure of a gap at an attachment point, a measure of lamination between printed layers, a measure of vertical alignment of printed layers, a measure of overhang, a quality of a printed support structure, a quality of a printed bridging structure, a quality of a structure creating a void, and so forth.

At 710, it is determined that the difference exceeds a threshold, such as the difference indicating that a change to how the printer should act is needed. This change can be through change of operating parameters, as noted above. The calibration module 120 may make this determination, though it may do so with assistance from various remote (e.g., server based) resources.

At 712, an operating parameter of the 3D printer that is associated with the identified difference is identified. In some cases multiple operating parameters are altered, or multiple iterations of method 700 are performed to cause the 3D printer to correctly print the predefined object.

At 714, the operating parameter is adjusted to reduce, in subsequent printing operations, the difference between the print characteristic of the predefined test object and the analogous print characteristic of the benchmark.

As described above, the apparatuses and techniques can be implemented to reduce waste print materials and machine time by discovering printing defects and errors sooner than waiting for the print job to complete. Further, the reliability of the output is improved by identifying errors in real time or nearly so, before they may be hidden by subsequent print layers. Additionally, the use of infrared imaging and other sensing technology may improve reliability by revealing defects that are hidden even if they are not detected in real time.

These improvement also reduce the time commitment of the user and may allow 3D printers to be constructed with less expensive components because the monitoring and feedback system provides accurate size, color, density, or positional data, so components such as motors and bearings can be smaller and simpler. Alone or in combination with the feedback and monitoring system, the calibration techniques also improve performance by detecting potential defects before the printing operations even begin. Simple and inexpensive test objects may be printed to ensure the printer is properly calibrated and functioning before more complicated and expensive projects are started.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A system for improving print quality of a three-dimensional (3D) printer, comprising:
    a camera configured to capture an image of an object being printed by the 3D printer while the object is being printed; and
    an image processing system comprising:
        a processor; and
        a computer-readable media device embodying computer-executable instructions that, when executed by the processor, implement an image-comparison module configured to perform operations comprising:
            receiving, from the camera while the 3D printer is printing, the image of the object being printed by the 3D printer;
            comparing the image to a benchmark image, the benchmark image being an image that accurately represents the object being printed;
            identifying a difference between an element of the object and an analogous element of the benchmark image;
            determining an operating parameter of the 3D printer related to the difference; and
            sending a control signal to the 3D printer, the control signal effective to adjust the operating parameter of the 3D printer while the 3D printer is printing, the adjustment effective to reduce the difference between the element of the object and the analogous element of the benchmark image.

2. The system of claim 1, wherein sending the control signal to adjust the operating parameter of the 3D printer while the 3D printer is printing is effective to decrease the difference between the element of the object and the analogous element of the benchmark image in subsequent instances of printing the object.

3. The system of claim 2, wherein the operating parameter is one or more selected from the group of:
   a distance between a printing nozzle of the 3D printer and a base plate of the 3D printer;
   a distance between the printing nozzle of the 3D printer and a surface of a previously printed layer of the object being printed;
   a velocity of the printing nozzle of the 3D printer;
   a vertical position of the base plate of the 3D printer;
   a temperature of the printing nozzle of the 3D printer;
   a temperature of a material being extruded from the printing nozzle of the 3D printer;
   a temperature of the base plate of the 3D printer; and
   a rate of extrusion from the printing nozzle of the 3D printer.

4. The system of claim 2, wherein the operating parameter is a location of the printing nozzle of the 3D printer as an X-Y coordinate location with reference to a plane represented by the base plate of the 3D printer.

5. The system of claim 1, wherein the image-comparison module is further configured to perform operations comprising:
   responsive to adjusting the operating parameter of the 3D printer while the 3D printer is printing, the adjustment effective to decrease the difference between the element of the object and the analogous element of the benchmark image, identifying a value of the adjusted parameter;
   associating the value of the adjusted parameter with the difference;
   storing the value of the adjusted parameter associated with the difference; and
   responsive to determining a subsequent difference between the element of the object and the analogous element of the benchmark image, using the associated value to adjust the parameter.

6. The system of claim 1, wherein the image-comparison module is further configured to perform operations comprising:
   receiving, from the camera while the 3D printer is printing, another image of the object being printed by the 3D printer;
   comparing the other image to the benchmark image;
   determining another difference between the element of the object and the analogous element of the benchmark image;
   determining that the other difference exceeds a threshold;
   responsive to determining that the other difference exceeds the threshold, sending a first control signal to the 3D printer, the first control signal effective to cause the 3D printer to pause printing the object; and
   responsive to sending the first control signal, sending a second control signal, the second control signal effective to cause the 3D printer to display an error message.

7. The system of claim 6, wherein the image process system includes a communication interface and the image-comparison module is further configured to perform operations comprising responsive to sending the first control signal, sending an error message to a mobile device, via the communication interface.

8. The system of claim 1, further comprising a sensor, and wherein the operations further comprise:
   receiving, from the sensor while the 3D printer is printing, an input value related to a print quality characteristic of the object;
   comparing the input value to a benchmark value;
   measuring a difference between the input value and the benchmark value;
   identifying another operating parameter of the 3D printer related to the difference between the input value and the benchmark value; and
   sending another control signal to the 3D printer, the other control signal effective to adjust the other operating parameter of the 3D printer while the 3D printer is printing.

9. The system of claim 8, wherein the sensor is a force transducer, a temperature sensor, or a SONAR detector array.

10. The system of claim 1, wherein the 3D printer further comprises a test target having one or more visual characteristics that are known to the image processing system, and wherein the operations further comprise:
   receiving, from the camera, an image of the test target;
   analyzing the image to determine the visual characteristics of the test target as represented in the image;
   comparing the visual characteristics of the test target as represented in the image to the known visual characteristics of the test target; and
   adjusting operating parameters of the camera effective to match the visual characteristics of the test target, as represented in the image, to the known visual characteristics.

11. The system of claim 10, wherein the known visual characteristic of the test target is one or more of a shape, a color, a size, or a distance from the camera.

12. A method for improving print quality of a three-dimensional (3D) printer, comprising:
   receiving, from a camera communicatively connected to the 3D printer and while the 3D printer is printing, an image of an object being printed by the 3D printer;
   comparing the image to a benchmark image, the benchmark image being an image that accurately represents the object being printed;
   identifying a difference between an element of the object and an analogous element of the benchmark image;
   determining an operating parameter of the 3D printer related to the difference; and
   sending a control signal to the 3D printer, the control signal effective to adjust the operating parameter of the 3D printer while the 3D printer is printing, the adjustment effective to reduce the difference between the element of the object and the analogous element of the benchmark image.

13. The method of claim 12, further comprising sending the operating parameter to the 3D printer, effective to enable the 3D printer to determine a control signal to adjust the operating parameter effective to decrease the difference between the element of the object and the analogous element of the benchmark image in subsequent printing operations.

14. The method of claim 13, wherein sending the operating parameter to the 3D printer, effective to enable the 3D printer to determine a control signal to adjust the operating parameter effective to decrease the difference between the element of the object and the analogous element of the benchmark image in subsequent printing operations further comprises determining the control signal by:
   identifying a previously stored value of the parameter associated with the difference, the previously stored value having been adjusted to decrease the difference in a previous printing operation; and using the previously stored value to adjust the operating parameter.

15. The method of claim 12, further comprising sending a control signal to the 3D printer, the control signal causing the 3D printer to adjust the operating parameter effective to decrease the difference between the element of the object and the analogous element of the benchmark image in subsequent printing operations.

16. The method of claim 15, wherein sending a control signal to the 3D printer, the control signal causing the 3D printer to adjust the operating parameter effective to decrease the difference between the element of the object and the analogous element of the benchmark image in subsequent printing operations further comprises:

responsive to adjusting the operating parameter of the 3D printer, identifying a value of the adjusted parameter;

associating the value of the adjusted parameter with the difference;

storing the value of the adjusted parameter associated with the difference; and responsive to identifying a subsequent difference between the element of the object and the analogous element of the benchmark image, using the associated value to adjust the parameter.

17. The method of claim 12, further comprising:

receiving, from the camera while the 3D printer is printing, another image of the object being printed by the 3D printer;

comparing the other image to the benchmark image;

identifying another difference between the element of the object and the analogous element of the benchmark image;

determining that the other difference exceeds a threshold;

responsive to determining that the other difference exceeds the threshold, sending a first control signal to the 3D printer, the first control signal effective to cause the 3D printer to pause printing the object; and responsive to sending the first control signal, sending a second control signal, the second control signal effective to cause the 3D printer to display an error message.

18. The method of claim 17, wherein the second control signal is further effective to cause the 3D printer to transmit the error message to another device.

19. The method of claim 12, wherein the 3D printer includes a test target having one or more known visual characteristics, the method further comprising:

receiving, from the camera, an image of the test target;

analyzing the image to determine the visual characteristics of the test target as represented in the image;

comparing the visual characteristics of the test target as represented in the image to the known visual characteristics of the test target; and adjusting operating parameters of the camera effective to match the visual characteristics of the test target, as represented in the image, to the known visual characteristics of the test target.

20. The method of claim 19, wherein the known visual characteristic of the test target is one or more of a shape, a color, a size, or a distance from the camera.

* * * * *